(12) United States Patent
Yabuuchi

(10) Patent No.: US 11,431,259 B2
(45) Date of Patent: Aug. 30, 2022

(54) POWER CONVERSION DEVICE FOR REDUCING VOLTAGE RIPPLE AND VOLTAGE SPIKE VIA CONNECTION OF A TRANSFORMER AND A CAPACITOR TO A GROUNDING SURFACE

(71) Applicant: Mitsubishi Electric Corporation, Tokyo (JP)

(72) Inventor: Naoya Yabuuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 385 days.

(21) Appl. No.: 16/343,508

(22) PCT Filed: Oct. 26, 2016

(86) PCT No.: PCT/JP2016/081672
§ 371 (c)(1),
(2) Date: Apr. 19, 2019

(87) PCT Pub. No.: WO2018/078734
PCT Pub. Date: May 3, 2018

(65) Prior Publication Data
US 2021/0281188 A1    Sep. 9, 2021

(51) Int. Cl.
*H02M 7/06* (2006.01)
*H02M 1/14* (2006.01)
(Continued)

(52) U.S. Cl.
CPC ............ *H02M 7/06* (2013.01); *H02M 1/14* (2013.01); *H02M 7/003* (2013.01); *H02M 1/0064* (2021.05)

(58) Field of Classification Search
CPC ..... H02M 3/335–42; H02M 7/06; H02M 1/14
See application file for complete search history.

(56) References Cited

U.S. PATENT DOCUMENTS 4,053,815 A * 10/1977 Sircom .................... H02H 1/06
361/113
2004/0179378 A1    9/2004 Tamura
(Continued)

FOREIGN PATENT DOCUMENTS

CN         101599698 A      12/2009
CN         204068683 U      12/2014
(Continued)

OTHER PUBLICATIONS

Communication dated Jun. 2, 2020 by The State Intellectual Property Office of People's Republic of English China in Application No. 201680090227.7.
(Continued)

*Primary Examiner* — Peter M Novak
(74) *Attorney, Agent, or Firm* — Sughrue Mion, PLLC; Richard C. Turner

(57) ABSTRACT

A power conversion device includes a transformer circuit formed of a center-tapped isolation transformer, a rectifying circuit formed of a semiconductor switch element connected to the transformer circuit, a smoothing circuit formed of a capacitor connected to the rectifying circuit, a positive terminal and a negative terminal connected to a load, and a grounding surface to which the negative terminal is connected, wherein a current path along which only an AC current flows is shortened by a negative terminal of the isolation transformer and a negative terminal of the capacitor being connected before being connected to the grounding surface, or the negative terminal connected to the load and the negative terminal of the capacitor being connected before being connected to the grounding surface.

14 Claims, 13 Drawing Sheets

(51) Int. Cl.
*H02M 7/00* (2006.01)
*H02M 1/00* (2006.01)

(56) References Cited

U.S. PATENT DOCUMENTS

| | | | | |
|---|---|---|---|---|
| 2009/0147543 | A1* | 6/2009 | Sugawara | H02M 3/33569 |
| | | | | 363/16 |
| 2010/0103704 | A1 | 4/2010 | Adragna et al. | |
| 2010/0284203 | A1 | 11/2010 | Moussaoui | |
| 2012/0049624 | A1* | 3/2012 | Lee | H02M 3/33561 |
| | | | | 307/31 |
| 2015/0124488 | A1 | 5/2015 | Dai et al. | |
| 2016/0242308 | A1 | 8/2016 | Nakazawa et al. | |
| 2018/0367031 | A1* | 12/2018 | Ando | H02M 3/33584 |

FOREIGN PATENT DOCUMENTS

| | | |
|---|---|---|
| EP | 2190109 A1 | 5/2010 |
| EP | 2251967 A3 | 12/2010 |
| EP | 3057217 A1 | 8/2016 |
| JP | 64-077474 A | 3/1989 |
| JP | 06-205581 A | 7/1994 |
| JP | 2003-023773 A | 1/2003 |
| JP | 2008-178205 A | 7/2008 |
| JP | 4151014 B2 | 9/2008 |
| JP | 2010-246316 A | 10/2010 |
| JP | 2013-247814 A | 12/2013 |
| WO | 2014091839 A1 | 6/2014 |
| WO | 2015079830 A1 | 6/2015 |

OTHER PUBLICATIONS

Communication dated Dec. 29, 2020 from the National Intellectual Property Office of The P.R. of China in Appl. No. 201680090227.7.
Communication dated Oct. 8, 2019 from the European Patent Office in application No. 16919803.3.
International Search Report of PCT/JP2016/081672 dated Nov. 29, 2016.
Communication dated Oct. 9, 2020, issued by the European Patent Office in application No. 16 919 803.3.
Office Action dated Jun. 3, 2021 in Chinese Application No. 201680090227.7.
Communication dated Jul. 5, 2021 from the European Patent Office in Application No. 16919803.3.
Communication dated Dec. 13, 2021 from the China National Intellectual Property Administration in Chinese Application No. 201680090227.7.
Office Action dated Mar. 2, 2022 in Chinese Application No. 201680090227.7.

* cited by examiner

POWER CONVERSION DEVICE FOR REDUCING VOLTAGE RIPPLE AND VOLTAGE SPIKE VIA CONNECTION OF A TRANSFORMER AND A CAPACITOR TO A GROUNDING SURFACE

CROSS REFERENCE TO RELATED APPLICATIONS

This application is a National Stage of International Application No. PCT/JP2016/081672 filed Oct. 26, 2016.

TECHNICAL FIELD

The present invention relates to a power conversion device having a center-tapped isolation transformer, a synchronous rectifying circuit formed of a semiconductor switch element, and a smoothing circuit formed of a capacitor.

BACKGROUND ART

An electric vehicle or a hybrid vehicle, in the same way as a vehicle that moves using an internal combustion engine, includes an auxiliary battery for a control circuit that causes an electrical component to operate. However, there is no internal combustion engine forming a driving source in an electric vehicle, and an alternator cannot be used because a start-stop system (a system such that an internal combustion engine is automatically stopped when a vehicle temporarily stops, such as when waiting for lights to change at an intersection) for improving fuel economy and reducing exhaust gas is employed in a hybrid vehicle. Because of this, a power conversion device, such as a step-down converter, that supplies energy from a driving battery that causes a travel motor to operate to an auxiliary battery, is needed in an electric vehicle or a hybrid vehicle.

Further, a positive side and a negative side of the driving battery are both isolated from a chassis, while a negative side of a load is grounded at the chassis, because of which insulation is needed between an input and an output of the power conversion device. Herein, there is a characteristic in that the input and the output can be isolated in a device in which an isolation transformer is used. Integrating an input choke coil and an output choke coil, which are magnetic parts, with an isolation transformer, winding a primary coil and a secondary coil of the isolation transformer and the input and output choke coils around the same core, reducing core capacity by reducing an amount of direct current-biased magnetization of the core in a direction canceling a direct current magnetic flux created by each coil, and achieving increased efficiency by reducing core loss, has been proposed as technology using an isolation transformer, in Patent Document 1 cited below. According to Patent Document 1, full-wave rectification is carried out using a center tap of the isolation transformer, thereby realizing increased efficiency and a reduction in size.

CITATION LIST

Patent Literature

Patent Document 1: Japanese Patent No. 4,151,014

SUMMARY OF INVENTION

Technical Problem

A configuration such that a negative terminal of an isolation transformer, a negative terminal of a capacitor, and a negative terminal of a load (an auxiliary battery, an electric component, or the like) connected to a secondary side of the isolation transformer are connected to a grounding surface, which is a metal frame, is employed in the power conversion device proposed in Patent Document 1.

This kind of configuration is such that to date, when carrying out a supply of power to a load, a DC current (Idc) supplies power to the load from a positive terminal of the isolation transformer via a smoothing circuit, flows along a grounding surface, which forms a return path from the negative terminal of the load, and returns to the negative terminal of the isolation transformer. An AC current (Iac) flows into the capacitor from the positive terminal of the isolation transformer, flows along a grounding surface, which forms a return path, from the negative terminal of the capacitor, and returns to the negative terminal of the isolation transformer, but at this time, the return path of the AC current along the grounding surface is a path of low impedance, differing from the return path of the DC current along the grounding surface, because of which, owing to an effect of an inductance component (Lp1) in the grounding surface along which only the AC current flows, a voltage Vac in accordance with the AC current (Iac) and the inductance component (Lp1) is generated. Because of this, there is a problem in that an output ripple and a voltage spike at an output terminal of the relevant component are such that the amount of Vac increases.

Technology such that an input choke coil, an output choke coil, and a transformer, which are magnetic parts, are inserted in order to control output ripple voltage and ripple current, and the inserted magnetic parts can be reduced in size, is introduced in Patent Document 1.

However, as there is no task for further reducing ripple and spike in the circuit configuration, there is a problem in that an increase in ripple and voltage spike occurs.

The invention has an object of providing a circuit configuration that restricts output ripple and spike in a power conversion device having a transformer circuit formed of a center-tapped isolation transformer, a rectifying circuit formed of a semiconductor switch element, and a smoothing circuit formed of a capacitor.

Solution to Problem

A transformer circuit formed of a center-tapped isolation transformer, a rectifying circuit formed of a semiconductor switch element connected to the transformer circuit, a smoothing circuit formed of a capacitor connected to the rectifying circuit, a positive terminal and a negative terminal connected to a load, and a grounding surface to which the negative terminal is connected, are included as a circuit configuration that restricts output ripple and spike, wherein a negative terminal of the isolation transformer and a negative terminal of the capacitor are connected before being connected to the grounding surface, or the negative terminal connected to the load and the negative terminal of the capacitor are connected before being connected to the grounding surface.

Advantageous Effects of Invention

According to the invention, a negative terminal of an isolation transformer and a negative terminal of a capacitor are connected before being connected to a grounding surface, or a negative terminal connected to a load and the negative terminal of the capacitor are connected before being connected to the grounding surface, because of which a current path along which only an AC current flows can be shortened, and output ripple and a voltage spike at an output terminal can be reduced.

DESCRIPTION OF EMBODIMENTS

Figure 1:
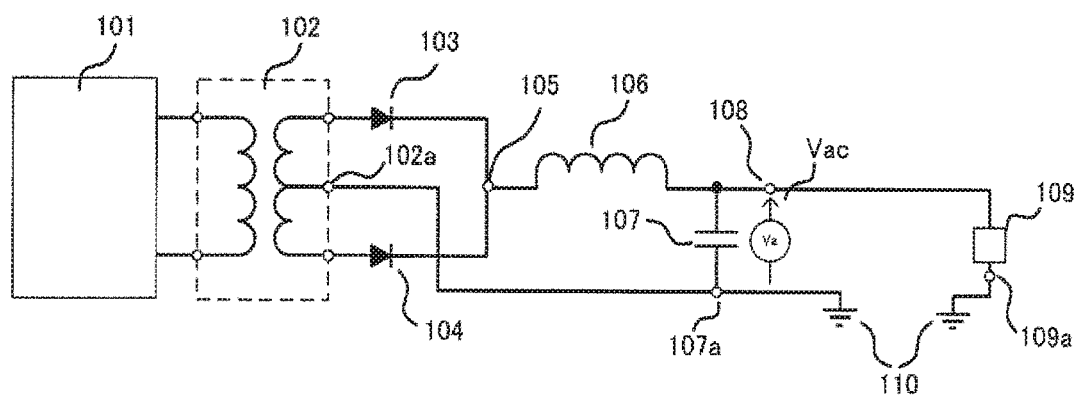
FIG. 1 is a schematic configuration diagram showing a power conversion device according to a first embodiment of the invention.

Hereafter, using the drawings, preferred embodiments of a power conversion device according to the invention will be described, but the same reference signs will be allotted to identical or corresponding portions in the drawings, and a redundant description will be omitted.

First Embodiment

FIG. 1 shows a configuration diagram of a first embodiment. 101 is a primary side circuit. 102 is a center-tapped isolation transformer configuring a transformer circuit. 102a is a negative terminal of the isolation transformer 102. 103 is a first switch element. 104 is a second switch element, and a rectifying circuit is configured of the first switch element 103 and the second switch element 104. 105 is a connection point of the first switch element 103 and the second switch element 104. 106 is a reactor. 107 is a capacitor configuring a smoothing circuit. 107a is a negative terminal of the capacitor 107. 108 is an output terminal. 109 is a load. 109a is a negative terminal of the load 109. 110 is a grounding surface. Vac is output ripple and voltage spike at the output terminal 108.

The primary side circuit 101 has an isolated power conversion circuit such as a flyback, a half bridge, or a full bridge, is configured of a switching element or a diode formed of a Si semiconductor such as a MOSFET or an IGBT or a wide-bandgap semiconductor of SiC, GaN, or the like, a capacitor, and a reactor, and is connected to a primary side winding of the isolation transformer 102. The primary side circuit 101 is controlled by a control circuit (not shown).

The isolation transformer 102 has a center tap in a secondary side winding, the center tap is the negative terminal 102a, which is connected to the grounding surface 110, and the negative terminal 102a of the isolation transformer 102 is connected to the negative terminal 107a of the capacitor 107 before being connected to the grounding surface 110. Also, the first switch element 103 and the second switch element 104 are connected one to each of the two ends of the secondary side winding of the isolation transformer 102, rectifying diodes are used as the first switch element 103 and the second switch element 104, and an anode terminal is connected to each. Also, cathode terminals of the first switch element 103 and the second switch element 104 are connected to each other, and the connection point 105 thereof is connected to the reactor 106, and is connected to a positive terminal of the load 109. Next, the capacitor 107 is connected in parallel to the load 109, and the negative terminal 107a of the capacitor 107 is connected to the negative terminal 102a of the isolation transformer 102, then connected to the grounding surface 110.

Figure 2:
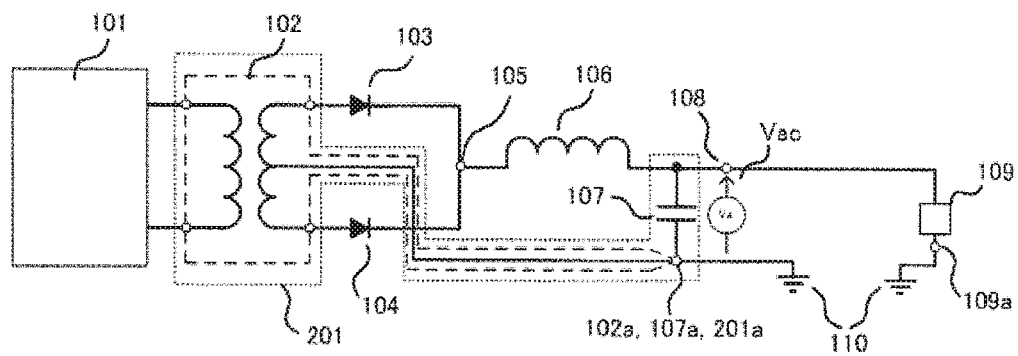
FIG. 2 is a schematic configuration diagram showing the power conversion device according to the first embodiment of the invention.

The isolation transformer 102 and the capacitor 107 also have an integrally formed aspect 201, which is shown in FIG. 2. The integrally formed article 201 is such that connection points of the negative terminal 102a of the isolation transformer 102 and the negative terminal 107a of the capacitor 107 are the same, and furthermore, a connection point of a negative terminal 201a of the integrally formed article 201 is the same. Because of this, an inductance component of a path along which both a DC current and an AC current flow can be minimized, and the effect of reducing ripple and voltage spike can be increased. Also, connecting parts and holding parts, such as a bus bar that connects the negative terminal 102a of the isolation transformer 102 and the negative terminal 107a of the capacitor 107, can be reduced, which also contributes to a size reduction.

Figure 3A:
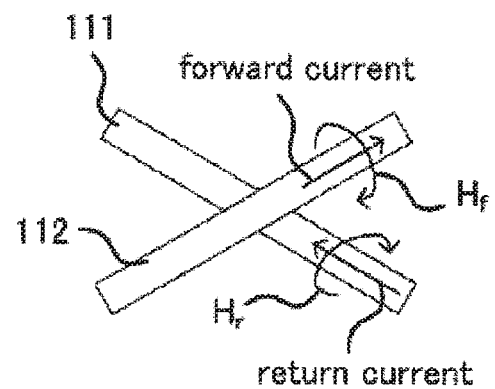
FIG. 3A is a schematic configuration diagram showing a connection configuration of the first embodiment of the invention.
Figure 3B:
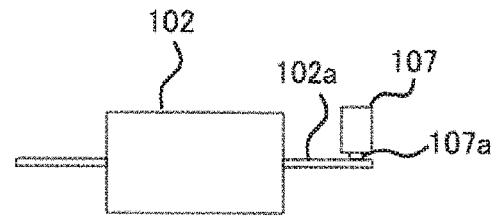
FIG. 3B is a schematic configuration diagram showing a connection configuration of the first embodiment of the invention.

Next, as a method of connecting the negative terminal 102a of the isolation transformer 102 and the negative terminal 107a of the capacitor 107, there is an aspect wherein the negative terminals are connected via a bus bar, a harness, or a substrate. By the negative terminals being connected so that the negative terminals cross or oppose a bus bar, a harness, or a substrate 111 with respect to a positive side current path 112, as shown in FIG. 3A, mutual inductance is reduced by a magnetic field Hf generated by current flowing to a smoothing circuit positive side and a magnetic field Hr generated by current flowing to the bus bar, the harness, or the substrate 111 connecting the negative terminals being canceled, because of which an inductance component of a path along which both a DC current and an AC current flow can be reduced, and the effect of reducing ripple and voltage spike can be increased. Furthermore, there is also an aspect wherein the negative terminals are directly connected, and by the bus bar, the harness, or the substrate 111 connecting the negative terminals being eliminated, an inductance component of a path along which both a DC current and an AC current flow can be minimized, and the effect of reducing ripple and voltage spike can be increased, while realizing a reduction in size and a reduction in cost. An actual connection is as shown in FIG. 3B.

Figure 4:
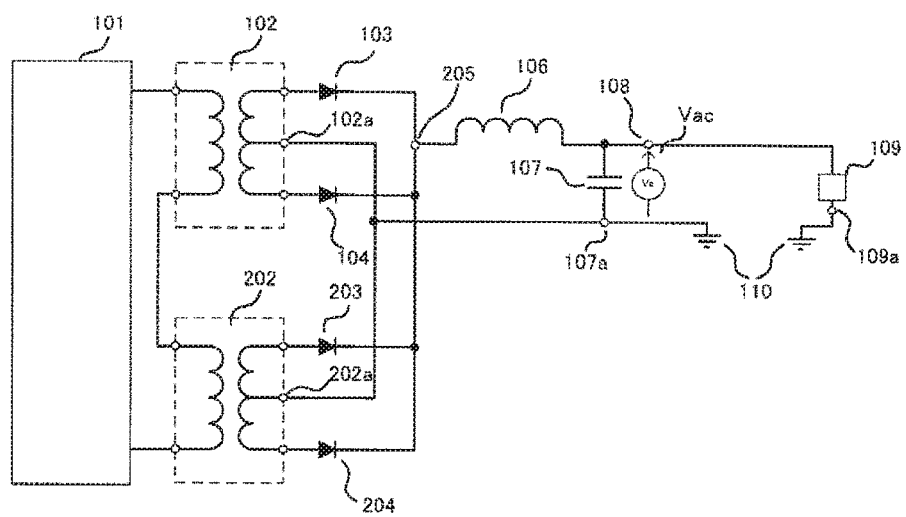
FIG. 4 is a schematic configuration diagram showing the power conversion device according to the first embodiment of the invention.

Next, there is also an aspect wherein two or more of the isolation transformer 102 are connected in series, which is shown in FIG. 4. One side of a primary side winding of an isolation transformer 202 connected in series to the isolation transformer 102 is connected to one side of the primary side winding of the isolation transformer 102, and another side is connected to the primary side circuit 101. Also, a secondary side winding of the transformer 202 connected in series has a center tap, the center tap is a negative terminal 202a connected to the grounding surface 110, and the negative terminal 202a of the isolation transformer 202 connected in series is connected to the negative terminal 102a of the isolation transformer 102 and the negative terminal 107a of the capacitor 107 before being connected to the grounding surface 110. Also, a third switch element 203 and a fourth switch element 204 are connected one to each of the two ends of the secondary side winding of the isolation transformer 202 connected in series, rectifying diodes are used as the third switch element 203 and the fourth switch element 204, and an anode terminal is connected to each. Also, cathode terminals of the first switch element 103, the second switch element 104, the third switch element 203, and the fourth switch element 204 are connected to each other, and a connection point 205 thereof is connected to the reactor 106. Next, the negative terminal 107a of the capacitor 107 is connected to the negative terminal 202a of the isolation transformer 202 connected in series to the negative terminal 102a of the isolation transformer 102, then connected to the grounding surface 110. In future, heat generated by a transformer will become a problem due to a further increase in power density, but a number of turns per transformer can be distributed owing to this configuration, and a particular advantage is obtained against an increase in ripple and voltage spike accompanying an increase in power density, while reducing heat generated by a transformer due to a winding.

Figure 5:
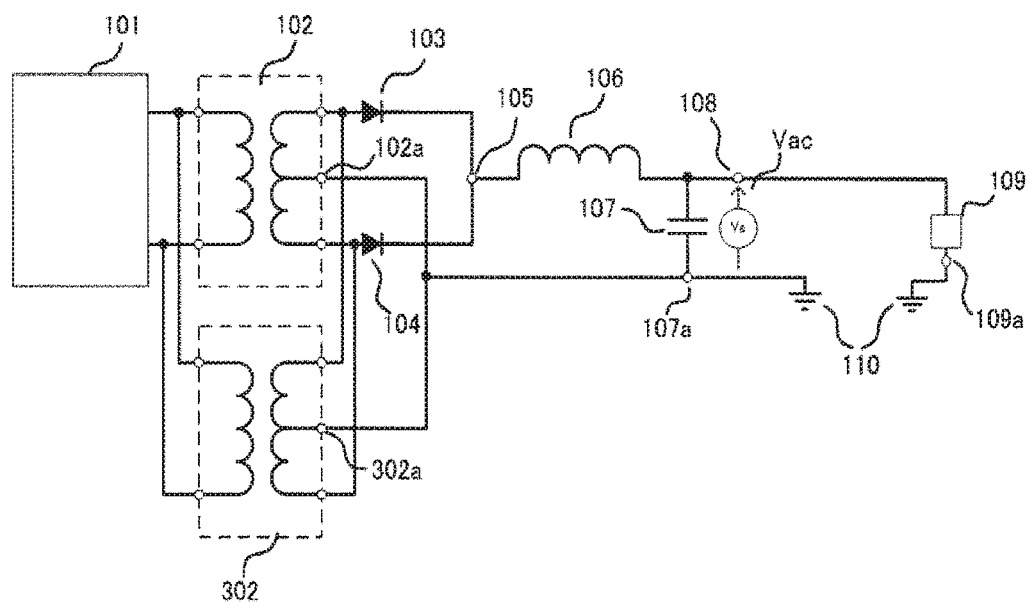
FIG. 5 is a schematic configuration diagram showing the power conversion device according to the first embodiment of the invention.

Next, there is also an aspect wherein two or more of the isolation transformer 102 are connected in parallel, which is shown in FIG. 5. A primary side winding of an isolation transformer 302 connected in parallel to the isolation transformer 102 is connected to the primary side circuit 101. Also, a secondary side winding of the transformer 302 connected in parallel has a center tap, the center tap is a negative terminal 302a connected to the grounding surface 110, and the negative terminal 302a of the isolation transformer 302 connected in parallel is connected to the negative terminal 102a of the isolation transformer 102 and the negative terminal 107a of the capacitor 107 before being connected to the grounding surface 110. Also, the first switch element 103 and the second switch element 104 are connected one to each of the two ends of the secondary side winding of the isolation transformer 302 connected in parallel, rectifying diodes are used as the first switch element 103 and the second switch element 104, and an anode terminal is connected to each. Next, the negative terminal 107a of the capacitor 107 is connected to the negative terminal 302a of the isolation transformer 302 connected in parallel to the negative terminal 102a of the isolation transformer 102, then connected to the grounding surface 110. In future, heat generated by a transformer will become a problem due to a further increase in power density, but a current capacity per transformer can be reduced owing to this configuration, and a particular advantage is obtained against an increase in ripple and voltage spike accompanying an increase in power density, while reducing heat generated by a transformer.

Figure 6:
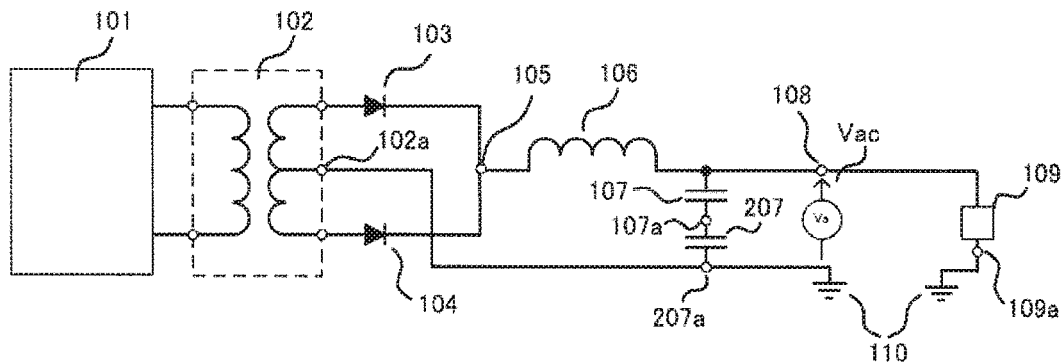
FIG. 6 is a schematic configuration diagram showing the power conversion device according to the first embodiment of the invention.

Next, there is also an aspect wherein two or more of the capacitor 107 are connected in series with respect to one isolation transformer 102, which is shown in FIG. 6 as an example in which two are connected in series. A second capacitor 207 connected in series to the capacitor 107 is connected to the negative terminal 107a of the capacitor 107, and a negative terminal 207a of the second capacitor 207 connected in series is connected to the negative terminal 102a of the isolation transformer 102, then connected to the grounding surface 110. Because of this, voltage applied to one of the capacitors can be lowered, and furthermore, although a parasitic inductance component of a capacitor through which only an AC current flows doubles in return for a short-circuit failure between the output terminal and grounding surface being preventable even when one of the two capacitors fails when a failure mode of the capacitors used is a short-circuit mode, an increase in output ripple and voltage spike can be kept to a minimum by adopting the configuration of FIG. 6.

Figure 7:
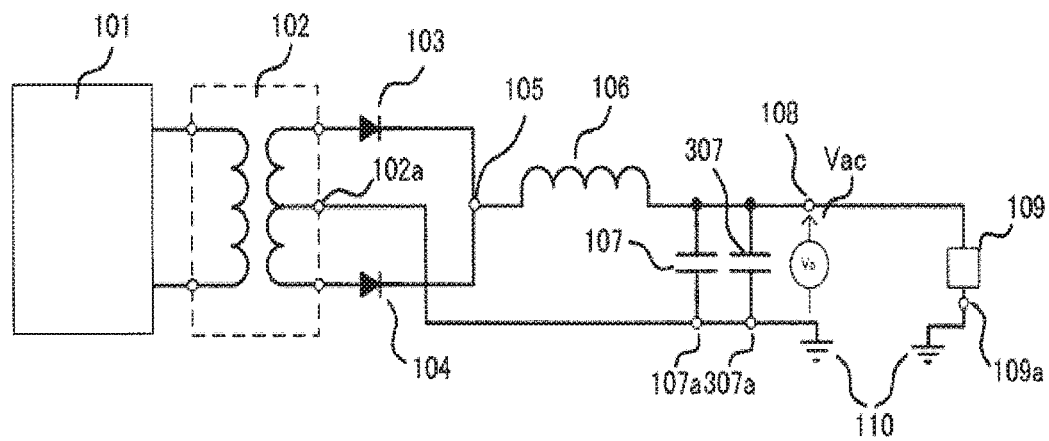
FIG. 7 is a schematic configuration diagram showing the power conversion device according to the first embodiment of the invention.

Also, there is also an aspect wherein two or more of the capacitor 107 are connected in parallel with respect to one isolation transformer 102, which is shown in FIG. 7 as an example in which two are connected in parallel. A third capacitor 307 is connected in parallel to the capacitor 107, and a negative terminal 307a of the third capacitor 307 connected in parallel is connected to the negative terminal 102a of the isolation transformer 102 and the negative terminal 107a of the capacitor 107, then connected to the grounding surface 110. Because of this, a parasitic inductance component of a capacitor through which only an AC current flows is halved, because of which a ripple current flowing to each capacitor can be reduced, while further increasing the effect of reducing output ripple and voltage spike.

Furthermore, there is also an aspect wherein capacities of the two or more capacitors are of differing capacity values, and can be adjusted to capacities responding to a multiple of frequency components included in output ripple and a voltage spike, because of which noise can be reduced.

Figure 8:
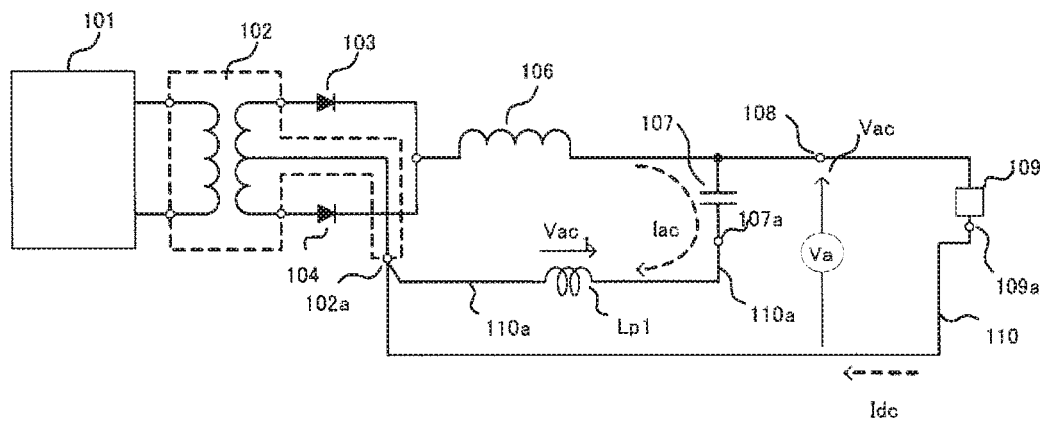
FIG. 8 is an equivalent circuit diagram showing an inductance componence of a grounding surface along which an AC current flows in an existing DC-DC converter shown for comparison.

As opposed to the configurations shown in the first embodiment, a configuration such that the negative terminal 102a of the isolation transformer 102 connected to the secondary side of the isolation transformer 102, the negative terminal 107a of the capacitor 107, and the negative terminal 109a of the load 109 (for example, an auxiliary battery, an electric component, or the like), are connected to the grounding surface 110, which is a metal frame, is adopted in an existing device, as shown in FIG. 8 for comparison purposes.

This kind of configuration is such that when supplying power to the load 109 to date, a DC current (Idc) supplies power to the load 109 from the positive terminal of the isolation transformer 102 via a smoothing circuit, flows along the grounding surface 110, which forms a return path, from the negative terminal 109a of the load 109, and returns to the negative terminal 102a of the transformer. That is, the grounding surface 110 forms a return path of the DC current (Idc) supplied to the load 109.

Consequently, an AC current (Iac) flows into the capacitor 107 from the positive terminal of the isolation transformer 102, flows along the grounding surface 110, which forms a return path, from the negative terminal 107a of the capacitor 107, and returns to the negative terminal 102a of the isolation transformer 102, and at this time, the return path of the AC current along the grounding surface 110 is a path of low impedance, therefore differing from the return path of the DC current along the grounding surface 110, because of which, owing to an effect of an inductance component (Lp1) in the grounding surface 110 along which only the AC current flows, the voltage Vac in accordance with the AC current (Iac) and the inductance component (Lp1) is generated. Because of this, an output ripple and a voltage spike at an output terminal of the relevant component are such that the amount of Vac increases.

As opposed to this, the first embodiment of the invention is such that the AC current (Iac) flowing into a capacitor always flows via the negative terminal of the capacitor into a path along which the DC current (Idc) flows, because of which a current path along which only Iac flows is of a minimum length, and an inductance component in the path of Iac decreases, because of which ripple and the voltage spike (Vac) at the output terminal can be reduced.

Figure 9:
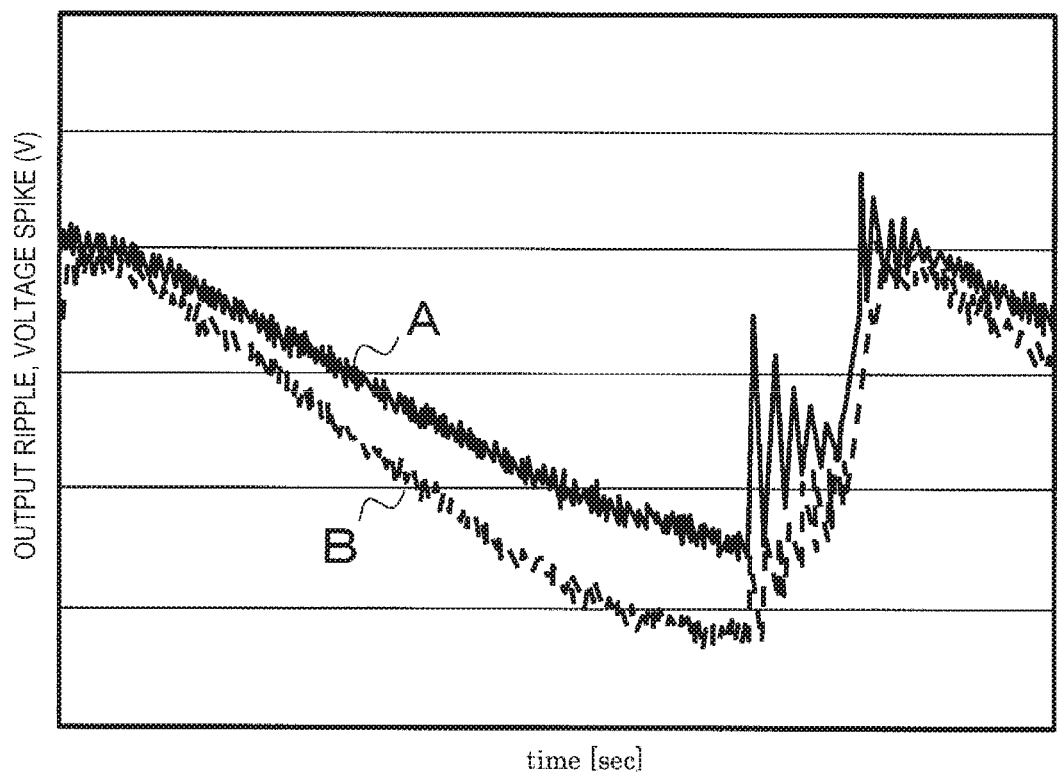
FIG. 9 is a waveform diagram showing a state of an output ripple and a voltage spike of a device having the configuration of the first embodiment of the invention and an existing device.

An example of output ripple and voltage spike waveforms of the existing form and the invention is as shown in FIG. 9.

In FIG. 9, a waveform A represents an output ripple and voltage spike waveform of the invention, and a waveform B represents an output ripple and voltage spike waveform of the existing form. As shown in FIG. 9, both a synchronous voltage fluctuation and a spike-form fluctuation caused by switching become smaller.

A range of application of the invention not being limited to the circuit configuration shown in FIG. 1 as the first embodiment, various kinds of modification can be carried out, as shown as differing embodiments by modified examples of the circuit in FIG. 10 to FIG. 29.

Second Embodiment

Figure 10:
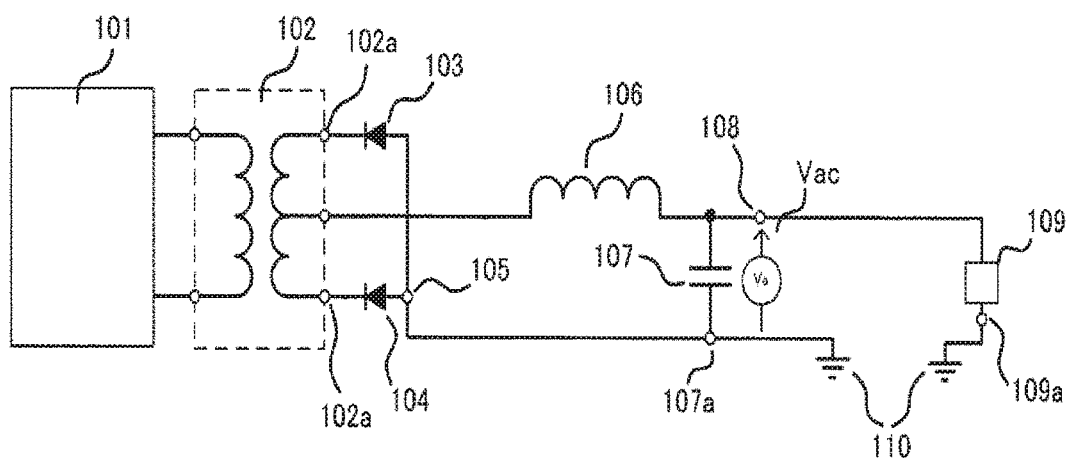
FIG. 10 is a schematic configuration diagram showing a power conversion device according to a second embodiment of the invention.

In the first embodiment, the center tap of the secondary side winding of the isolation transformer 102 is connected to the negative terminal of a capacitor before being connected to the grounding surface, but in a second embodiment, the center tap of the secondary side winding of the isolation transformer 102 is connected to the reactor 106, as shown in FIG. 10. Next, the cathode terminals of the first switch element 103 and the second switch element 104 are connected one to each of the two ends of the secondary side winding of the isolation transformer 102. Also, the anode terminals of the first switch element 103 and the second switch element 104 are connected to each other, and the connection point 105 thereof is connected to the negative terminal 107a of the capacitor 107 before being connected to the grounding surface 110, which differs from the first embodiment.

Figure 11:
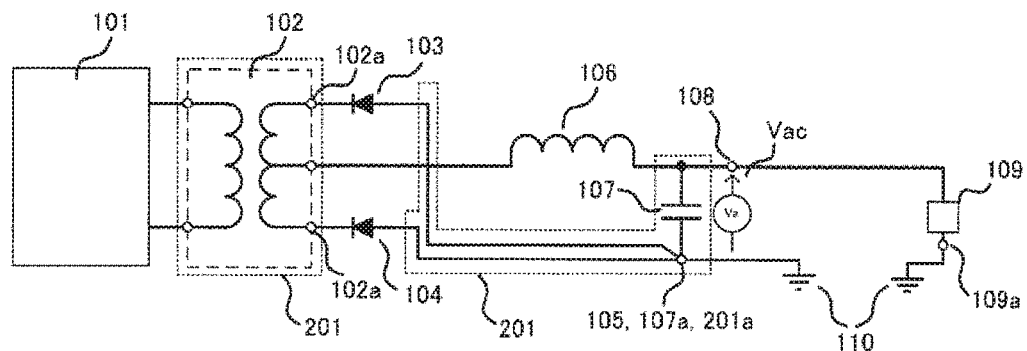
FIG. 11 is a schematic configuration diagram showing the power conversion device according to the second embodiment of the invention.

The isolation transformer 102 and the capacitor 107 also have the aspect 201, which is an integrally formed configuration and is shown in FIG. 11. The integrally formed article 201 is such that the connection point 105 of the anode terminals of the first switch element 103 and the second switch element 104, the negative terminal 107a of the capacitor 107, and furthermore, the connection point of the negative terminal 201a of the integrally formed article 201, are the same. Because of this, an inductance component of a path along which both a DC current and an AC current flow can be minimized, and the effect of reducing ripple and voltage spike can be increased. Also, connecting parts and holding parts, such as a bus bar that connects the connection point 105 of the anode terminals of the first switch element 103 and the second switch element 104 and the negative terminal 107a of the capacitor 107, can be eliminated, which also contributes to a size reduction.

Figure 12A:
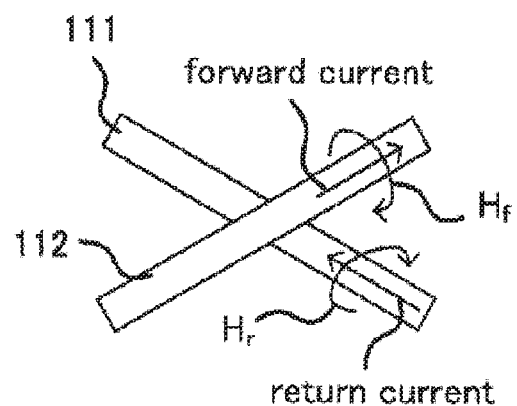
FIG. 12A is a schematic configuration diagram showing a connection configuration of the second embodiment of the invention.
Figure 12B:
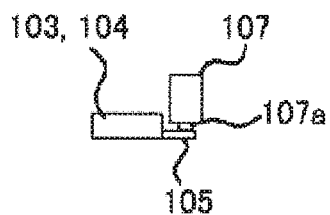
FIG. 12B is a schematic configuration diagram showing a connection configuration of the second embodiment of the invention.

Next, as a method of connecting the connection point 105 of the first switch element 103 and the second switch element 104 and the negative terminal 107a of the capacitor 107, there is an aspect wherein connection is carried out via a bus bar, a harness, or a substrate, and by the connection point 105 and the negative terminal 107a being connected so that the connection point 105 and the negative terminal 107a cross or oppose a bus bar, a harness, or the substrate 111 with respect to the positive side current path 112, as shown in FIG. 12A, mutual inductance is reduced by the magnetic field Hf generated by current flowing to the smoothing circuit positive side and the magnetic field Hr generated by current flowing to the bus bar, the harness, or the substrate 111 connecting the connection point 105 and the negative terminal 107a being canceled, because of which an inductance component of a path along which both a DC current and an AC current flow can be reduced, and the effect of reducing ripple and voltage spike can be increased. Furthermore, there is also an aspect wherein the connection point of the switch elements and the negative terminal 107a of the capacitor 107 are directly connected, and by the bus bar, the harness, or the substrate 111 connecting the connection point 105 and the negative terminal 107a being eliminated, an inductance component of a path along which both a DC current and an AC current flow can be minimized, and the effect of reducing ripple and voltage spike can be increased, while realizing a reduction in size and a reduction in cost. An actual connection is as shown in FIG. 12B.

Figure 13:
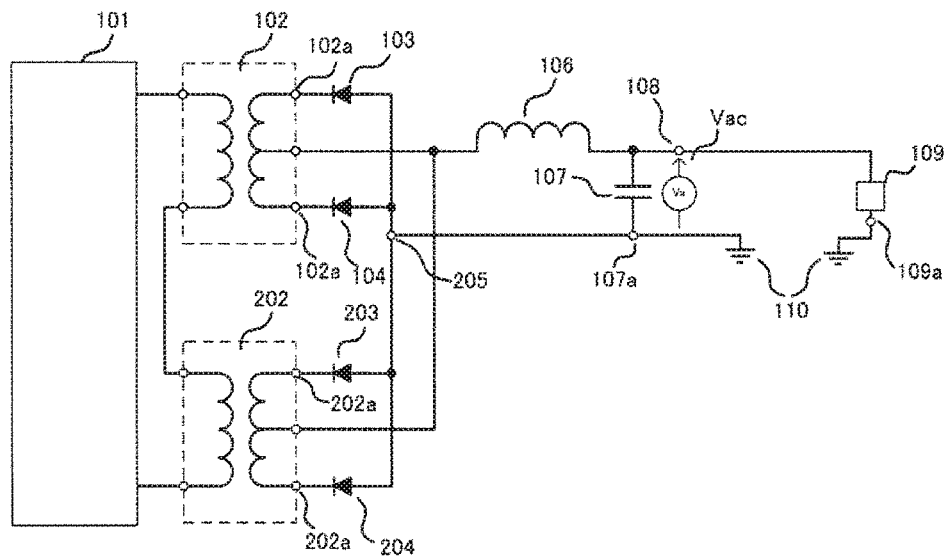
FIG. 13 is a schematic configuration diagram showing the power conversion device according to the second embodiment of the invention.

Next, there is also an aspect wherein two or more of the isolation transformer 102 are connected in series, which is shown in FIG. 13. One side of the primary side winding of the isolation transformer 202 connected in series to the isolation transformer 102 is connected to one side of the primary side winding of the isolation transformer 102, and the other side is connected to the primary side circuit 101. Also, the secondary side winding of the isolation transformer 202 connected in series has a center tap, and the center tap is connected to the reactor 106. Next, the third switch element 203 and the fourth switch element 204 are connected one to each of the two ends of the secondary side of the transformer connected in series, rectifying diodes are used as the third switch element 203 and the fourth switch element 204, and a cathode terminal is connected to each. Also, anode terminals of the first switch element 103, the second switch element 104, the third switch element 203, and the fourth switch element 204 are connected to each other, and the connection point 205 thereof is connected to the negative terminal 107a of the capacitor 107. Next, the negative terminal 107a of the capacitor 107 is connected to the connection point 205, then connected to the grounding surface 110. In future, heat generated by a transformer will become a problem due to a further increase in power density, but a number of turns per transformer can be distributed owing to this configuration, and a particular advantage is obtained against an increase in ripple and voltage spike accompanying an increase in power density, while reducing heat generated by a transformer due to a winding.

Figure 14:
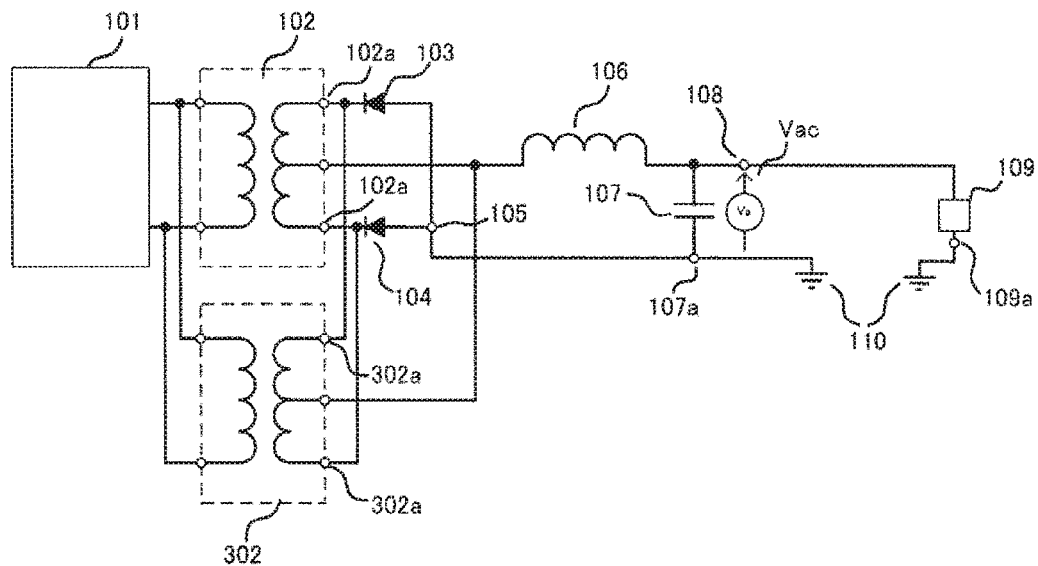
FIG. 14 is a schematic configuration diagram showing the power conversion device according to the second embodiment of the invention.

Next, there is also an aspect wherein two or more of the isolation transformer 102 are connected in parallel, which is shown in FIG. 14. The primary side winding of the isolation transformer 302 connected in parallel to the isolation transformer 102 is connected to the primary side circuit 101. Also, the secondary side winding of the transformer 302 connected in parallel has a center tap, and the center tap is connected to the reactor 106. Also, the first switch element 103 and the second switch element 104 are connected one to each of the two ends of the secondary side winding of the isolation transformer 302 connected in parallel, rectifying diodes are used as the first switch element 103 and the second switch element 104, and a cathode terminal is connected to each. In future, heat generated by a transformer will become a problem due to a further increase in power density, but a current capacity per transformer can be reduced owing to this configuration, and a particular advantage is obtained against an increase in ripple and voltage spike accompanying an increase in power density, while reducing heat generated by a transformer.

Figure 15:
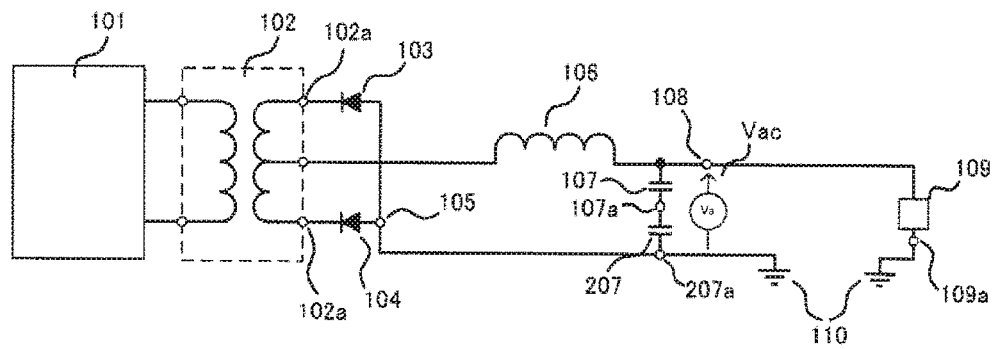
FIG. 15 is a schematic configuration diagram showing the power conversion device according to the second embodiment of the invention.

Next, there is also an aspect wherein two or more of the capacitor 107 are connected in series with respect to one isolation transformer 102, which is shown in FIG. 15 as an example in which two are connected in series. The second capacitor 207 connected in series to the capacitor 107 is connected to the negative terminal 107a of the capacitor 107, and the negative terminal 207a of the second capacitor 207 connected in series is connected to the negative terminal 102a of the isolation transformer 102, then connected to the grounding surface 110. Because of this, voltage applied to one of the capacitors can be lowered, and furthermore, although a parasitic inductance component of a capacitor through which only an AC current flows doubles in return for a short-circuit failure between the output terminal and grounding surface being preventable even when one of the two capacitors fails when a failure mode of the capacitors used is a short-circuit mode, an increase in output ripple and voltage spike can be kept to a minimum by adopting this configuration.

Figure 16:
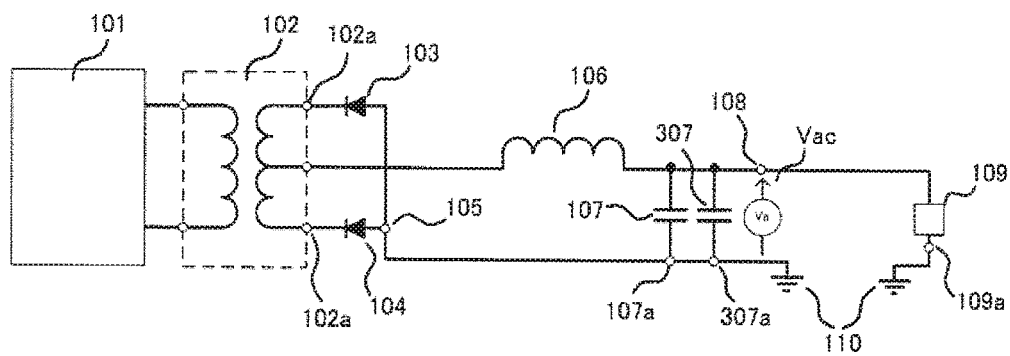
FIG. 16 is a schematic configuration diagram showing the power conversion device according to the second embodiment of the invention.

Also, there is also an aspect wherein two or more of the capacitor 107 are connected in parallel with respect to one isolation transformer 102, which is shown in FIG. 16 as an example in which two are connected in parallel. The third capacitor 307 is connected in parallel to the capacitor 107, and the negative terminal 307a of the third capacitor 307 connected in parallel is connected to the negative terminal 102a of the isolation transformer 102 and the negative terminal 107a of the capacitor 107, then connected to the grounding surface 110. Because of this, a parasitic inductance component of a capacitor through which only an AC current flows is halved, because of which a ripple current flowing to each capacitor can be reduced, while further increasing the effect of reducing output ripple and voltage spike.

Furthermore, there is also an aspect wherein capacities of the two or more capacitors are of differing capacity values, and can be adjusted to capacities responding to a multiple of frequency components included in output ripple and a voltage spike, because of which noise can be reduced.

The invention is such that the AC current (Iac) flowing into the capacitor 107 always flows via the negative terminal 107a of the capacitor 107 into a path along which the DC current (Idc) flows, because of which a current path along which only Iac flows is of a minimum length, and an inductance component in the path of Iac decreases, because of which ripple and the voltage spike (Vac) at the output terminal can be reduced.

Third Embodiment

Figure 17:
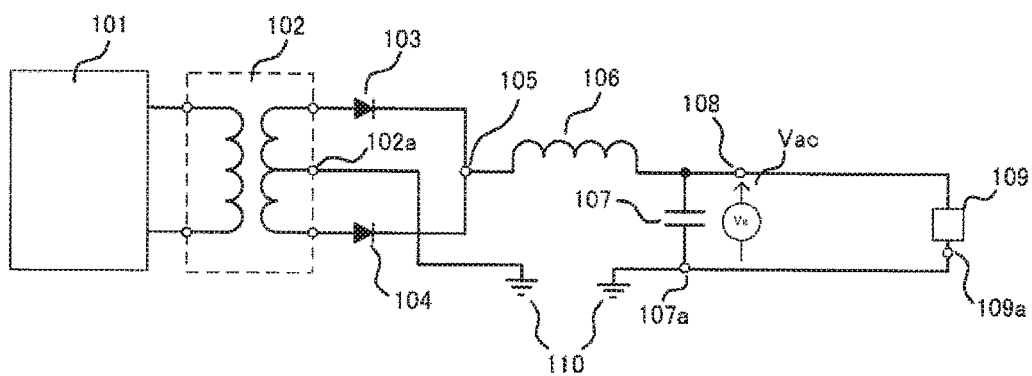
FIG. 17 is a schematic configuration diagram showing a power conversion device according to a third embodiment of the invention.

In the first embodiment, the negative terminal 102a of the isolation transformer 102 is connected to the negative terminal 107a of the capacitor 107 before being connected to the grounding surface 110, but in a third embodiment, the negative terminal 102a of the isolation transformer 102 is connected directly to the grounding surface 110, as shown in FIG. 17. Next, the negative terminal 107a of the capacitor 107 is connected to the negative terminal 109a of the load 109 before being connected to the grounding surface 110, which differs from the circuit of FIG. 1.

Figure 18:
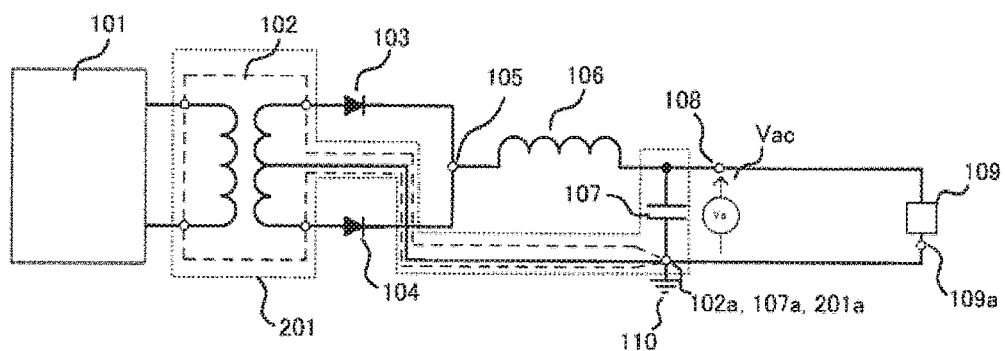
FIG. 18 is a schematic configuration diagram showing the power conversion device according to the third embodiment of the invention.

The isolation transformer 102 and the capacitor 107 also have the aspect 201, which is an integrally formed configuration and is shown in FIG. 18. Connection points of the negative terminal 102a of the isolation transformer 102, the negative terminal 107a of the capacitor 107, the negative terminal 201a of the integrally formed article 201, and furthermore, the grounding surface 110, are the same. Because of this, an inductance component of a path along which both a DC current and an AC current flow can be minimized, and the effect of reducing ripple and voltage spike can be increased.

Figure 19A:
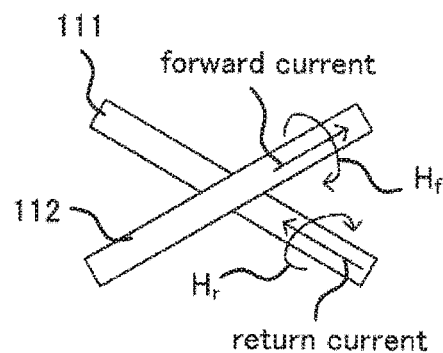
FIG. 19A is a schematic configuration diagram showing a connection configuration of the third embodiment of the invention.
Figure 19B:
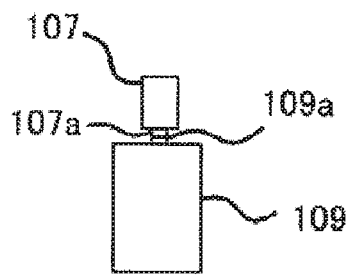
FIG. 19B is a schematic configuration diagram showing a connection configuration of the third embodiment of the invention.

Next, as a method of connecting the negative terminal 107a of the capacitor 107 and the negative terminal 109a of the load 109, there is an aspect wherein the negative terminals are connected via a bus bar, a harness, or a substrate. By the negative terminals being connected so that the negative terminals cross or oppose a bus bar, a harness, or the substrate 111 with respect to the positive side current path 112, as shown in FIG. 19A, mutual inductance is reduced by the magnetic field Hf generated by current flowing to the smoothing circuit positive side and the magnetic field Hr generated by current flowing to the bus bar, the harness, or the substrate 111 connecting the negative terminals being canceled, because of which an inductance component of a path along which both a DC current and an AC current flow can be reduced, and the effect of reducing ripple and voltage spike can be increased. Furthermore, there is also an aspect wherein the negative terminals are directly connected, and by the bus bar, the harness, or the substrate 111 connecting the negative terminals being eliminated, an inductance component of a path along which both a DC current and an AC current flow can be minimized, and the effect of reducing ripple and voltage spike can be increased, while realizing a reduction in size and a reduction in cost. An actual connection is as shown in FIG. 19B.

Figure 20:
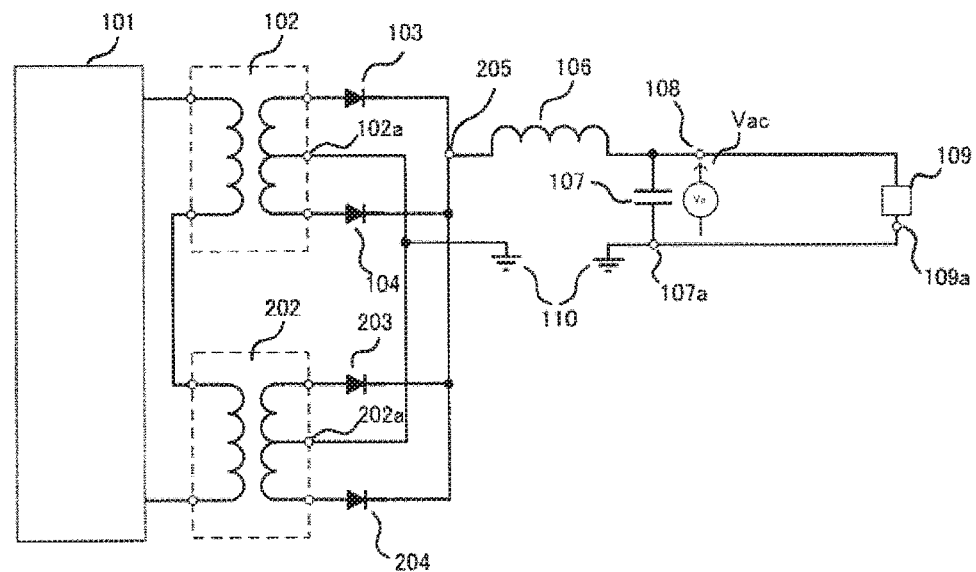
FIG. 20 is a schematic configuration diagram showing the power conversion device according to the third embodiment of the invention.

Next, there is also an aspect wherein two or more of the isolation transformer 102 are connected in series, which is shown in FIG. 20. One side of the primary side winding of the isolation transformer 202 connected in series to the isolation transformer 102 is connected to one side of the primary side winding of the isolation transformer 102, and the other side is connected to the primary side circuit 101. Also, the secondary side winding of the transformer 202 connected in series has a center tap, the center tap is the negative terminal 202a connected to the grounding surface 110, and the negative terminal 202a of the isolation transformer 202 connected in series is connected to the grounding surface 110. Also, the third switch element 203 and the fourth switch element 204 are connected one to each of the two ends of the secondary side winding of the isolation transformer 202 connected in series, rectifying diodes are used as the third switch element 203 and the fourth switch element 204, and an anode terminal is connected to each. Also, cathode terminals of the first switch element 103, the second switch element 104, the third switch element 203, and the fourth switch element 204 are connected to each other, and the connection point 205 thereof is connected to the reactor 106. In future, heat generated by a transformer will become a problem due to a further increase in power density, but a number of turns per transformer can be distributed owing to this configuration, and a particular advantage is obtained against an increase in ripple and voltage spike accompanying an increase in power density, while reducing heat generated by a transformer due to a winding.

Figure 21:
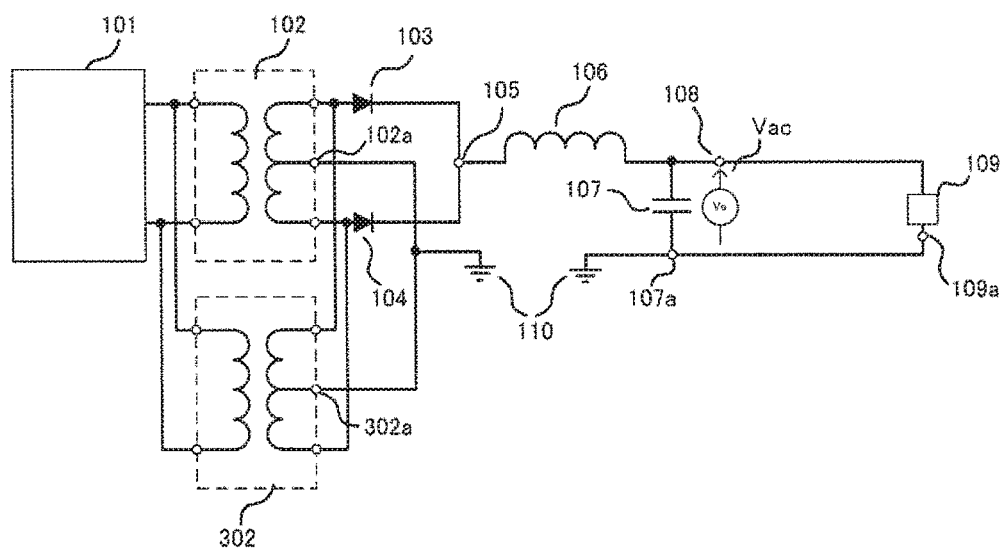
FIG. 21 is a schematic configuration diagram showing the power conversion device according to the third embodiment of the invention.

Also, there is also an aspect wherein two or more of the isolation transformer are connected in parallel, which is shown in FIG. 21. The primary side winding of the isolation transformer 302 connected in parallel to the isolation transformer 102 is connected to the primary side circuit 101. Also, the secondary side winding of the transformer 302 connected in parallel has a center tap, the center tap is the negative terminal 302a connected to the grounding surface 110, and the negative terminal 302a of the isolation transformer 302 connected in parallel is connected to the negative terminal 102a of the transformer 102 and the grounding surface 110. Also, the first switch element 103 and the second switch element 104 are connected one to each of the two ends of the secondary side winding of the isolation transformer 302 connected in parallel, rectifying diodes are used as the first switch element 103 and the second switch element 104, and an anode terminal is connected to each. In future, heat generated by a transformer will become a problem due to a further increase in power density, but a current capacity per transformer can be reduced owing to this configuration, and a particular advantage is obtained against an increase in ripple and voltage spike accompanying an increase in power density, while reducing heat generated by a transformer.

Figure 22:
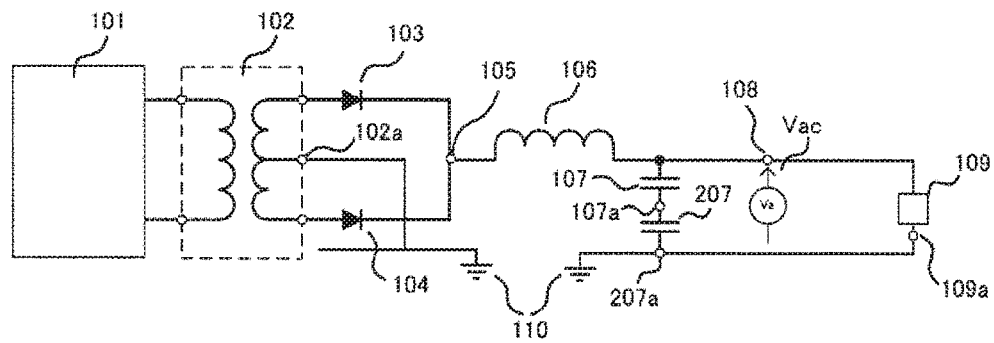
FIG. 22 is a schematic configuration diagram showing the power conversion device according to the third embodiment of the invention.

Next, there is also an aspect wherein two or more of the capacitor 107 are connected in series with respect to one isolation transformer 102, which is shown in FIG. 22 as an example in which two are connected in series. The second capacitor 207 connected in series to the capacitor 107 is connected to the negative terminal 107a of the capacitor 107, and the negative terminal 207a of the second capacitor 207 connected in series is connected to the negative terminal 109a of the load 109, then connected to the grounding surface 110. Because of this, voltage applied to one of the capacitors can be lowered, and although a parasitic inductance component of a capacitor through which only an AC current flows doubles in return for a short-circuit failure between the output terminal and grounding surface being preventable even when one of the two capacitors fails when a failure mode of the capacitors used is a short-circuit mode, an increase in output ripple and voltage spike can be kept to a minimum by adopting this configuration.

Figure 23:
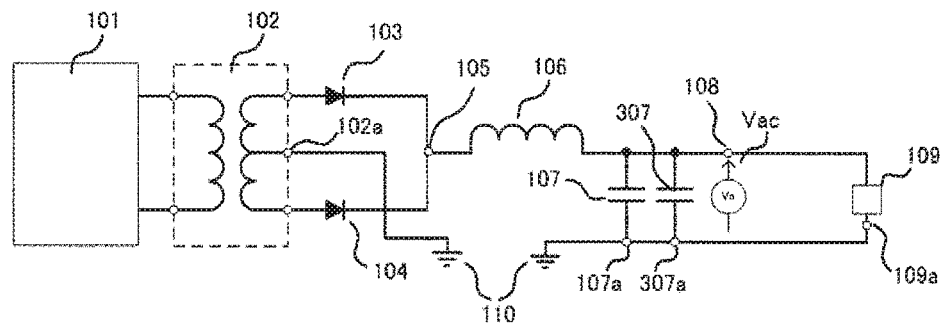
FIG. 23 is a schematic configuration diagram showing the power conversion device according to the third embodiment of the invention.

Also, there is also an aspect wherein two or more of the capacitor 107 are connected in parallel with respect to one isolation transformer 102, which is shown in FIG. 23 as an example in which two are connected in parallel. The third capacitor 307 is connected in parallel to the capacitor 107, and the negative terminal 307a of the third capacitor 307 connected in parallel is connected to the negative terminal 107a of the capacitor 107 and the negative terminal 109a of the load 109, then connected to the grounding surface 110. Because of this, a parasitic inductance component of a capacitor through which only an AC current flows is halved, because of which a ripple current flowing to each capacitor can be reduced, while further increasing the effect of reducing output ripple and voltage spike.

Furthermore, there is also an aspect wherein capacities of the two or more capacitors are of differing capacity values, and can be adjusted to capacities responding to a multiple of frequency components included in output ripple and voltage spike, because of which noise can be reduced.

The invention is such that the AC current (Iac) flowing into the capacitor 107 always flows via the negative terminal 107a of the capacitor 107 into a path along which the DC current (Idc) flows, because of which a current path along which only Iac flows is shortest, and an inductance component in the path of Iac decreases. Because of this, ripple and the voltage spike (Vac) at the output terminal can be reduced.

Fourth Embodiment

Figure 24:
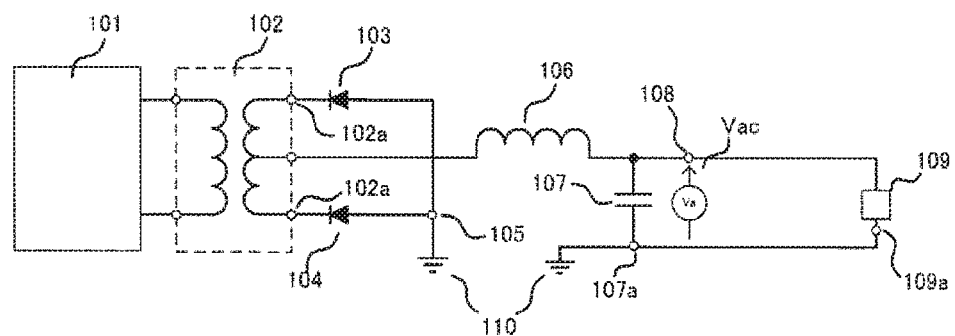
FIG. 24 is a schematic configuration diagram showing a power conversion device according to a fourth embodiment of the invention.

In the first embodiment, the center tap of the secondary side winding of the isolation transformer 102 is connected to the negative terminal 107a of the capacitor 107 before being connected to the grounding surface 110, but in a fourth embodiment, the center tap of the secondary side winding of the isolation transformer 102 is connected to the reactor 106, as shown in FIG. 24. Next, the cathode terminals of the first switch element 103 and the second switch element 104 are connected one to each of the two ends of the secondary side winding of the isolation transformer 102. Also, the anode terminals of the first switch element 103 and the second switch element 104 are connected to each other, and the connection point 105 thereof is connected to the grounding surface 110. Next, the negative terminal 107a of the capacitor 107 is connected to the negative terminal 109a of the load 109 before being connected to the grounding surface 110, which differs from the circuit of FIG. 1. The first switch element 103 and the second switch element 104 may be connected directly to the grounding surface 110, without passing through a connection point of the switch elements.

Figure 25:
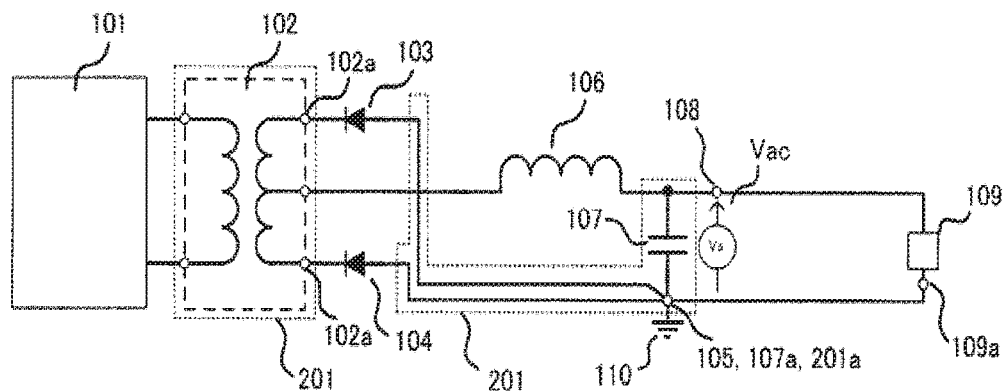
FIG. 25 is a schematic configuration diagram showing the power conversion device according to the fourth embodiment of the invention.

The isolation transformer 102 and the capacitor 107 also have an aspect that is an integrally formed configuration, which is shown in FIG. 25. The integrally formed article 201 is such that the connection point 105 of the anode terminals of the first switch element 103 and the second switch element 104, and the connection points of the negative terminal 107a of the capacitor 107, the negative terminal 201a of the integrally formed article 201, and furthermore, the grounding surface 110, are the same. Because of this, an inductance component of a path along which both a DC current and an AC current flow can be minimized, and the effect of reducing ripple and voltage spike can be increased.

Next, as a method of connecting the negative terminal 107a of the capacitor 107 and the negative terminal 109a of the load 109, there is an aspect wherein the negative terminals are connected via a bus bar, a harness, or a substrate. By the negative terminals being connected so that the negative terminals cross or oppose a bus bar, a harness, or the substrate 111 with respect to the positive side current path 112, as shown in FIG. 19A, mutual inductance is reduced by the magnetic field Hf generated by current flowing to the smoothing circuit positive side and the magnetic field Hr generated by current flowing to the bus bar, the harness, or the substrate 111 connecting the negative terminals being canceled, because of which an inductance component of a path along which both a DC current and an AC current flow can be reduced, and the effect of reducing ripple and voltage spike can be increased. Furthermore, there is also an aspect wherein the negative terminals are directly connected, and by the bus bar, the harness, or the substrate 111 connecting the negative terminals being eliminated, an inductance component of a path along which both a DC current and an AC current flow can be minimized, and the effect of reducing ripple and voltage spike can be increased, while realizing a reduction in size and a reduction in cost. An actual connection is as shown in FIG. 19B.

Figure 26:
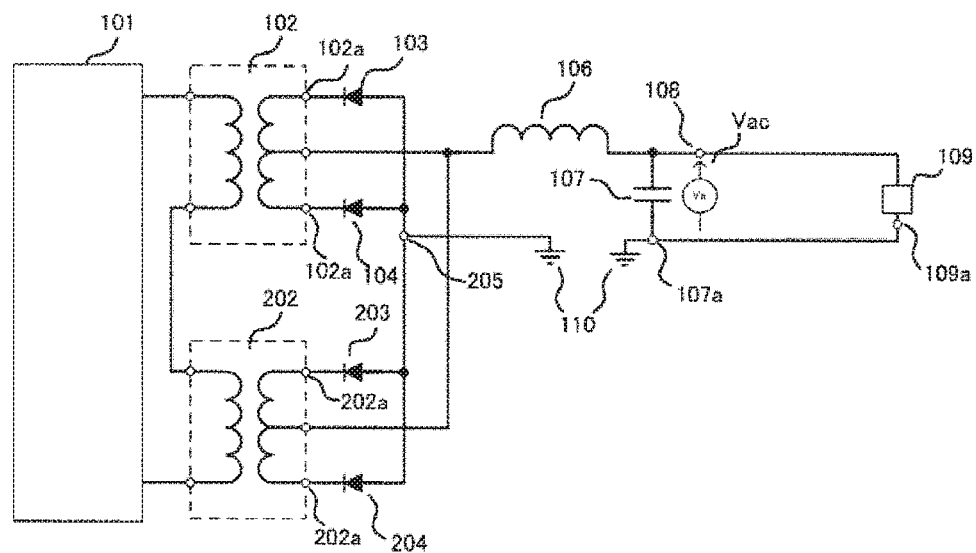
FIG. 26 is a schematic configuration diagram showing the power conversion device according to the fourth embodiment of the invention.

Next, there is also an aspect wherein two or more of the isolation transformer 102 are connected in series, which is shown in FIG. 26. One side of the primary side winding of the isolation transformer 202 connected in series to the isolation transformer 102 is connected to one side of the primary side winding of the isolation transformer 102, and the other side is connected to the primary side circuit 101. Also, the secondary side winding of the isolation transformer 202 connected in series has a center tap, and the center tap is connected to the reactor 106. Next, the third switch element 203 and the fourth switch element 204 are connected one to each of the two ends of the secondary side of the transformer connected in series, rectifying diodes are used as the third switch element 203 and the fourth switch element 204, and a cathode terminal is connected to each. Also, anode terminals of the first switch element 103, the second switch element 104, the third switch element 203, and the fourth switch element 204 are connected to each other, and the connection point 205 thereof is connected to the grounding surface 110. In future, heat generated by a transformer will become a problem due to a further increase in power density, but a number of turns per transformer can be distributed owing to this configuration, and a particular advantage is obtained against an increase in ripple and voltage spike accompanying an increase in power density, while reducing heat generated by a transformer due to a winding.

Figure 27:
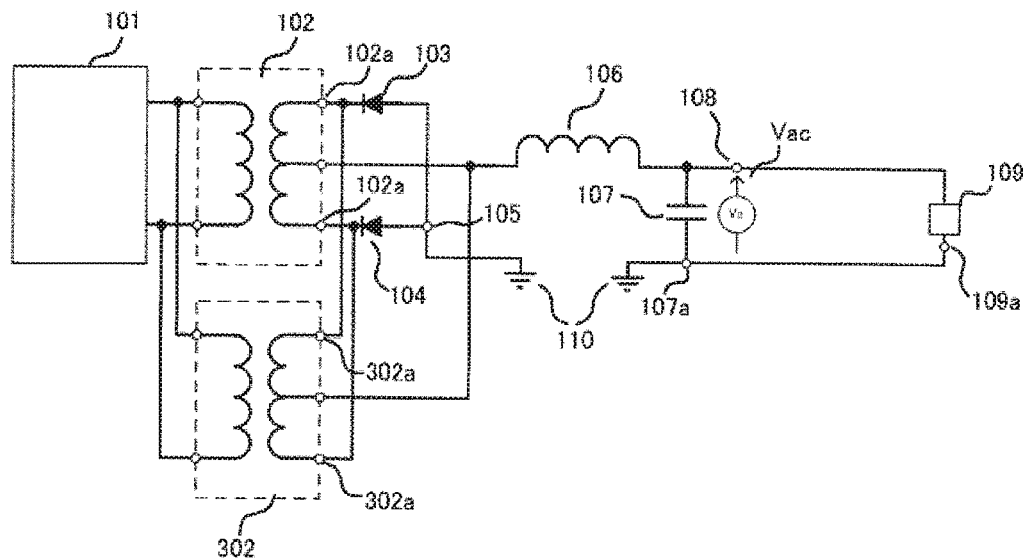
FIG. 27 is a schematic configuration diagram showing the power conversion device according to the fourth embodiment of the invention.

Also, there is also an aspect wherein two or more of the isolation transformer 102 are connected in parallel, which is shown in FIG. 27. The primary side winding of the isolation transformer 302 connected in parallel to the isolation transformer 102 is connected to the primary side circuit 101. Also, the secondary side winding of the transformer 302 connected in parallel has a center tap, and the center tap is connected to the reactor 106. Also, the first switch element 103 and the second switch element 104 are connected one to each of the two ends of the secondary side winding of the isolation transformer 302 connected in parallel, rectifying diodes are used as the first switch element 103 and the second switch element 104, and a cathode terminal is connected to each. In future, heat generated by a transformer will become a problem due to a further increase in power density, but a current capacity per transformer can be reduced owing to this configuration, because of which a particular advantage is obtained against an increase in ripple and voltage spike accompanying an increase in power density, while reducing heat generated by a transformer.

Figure 28:
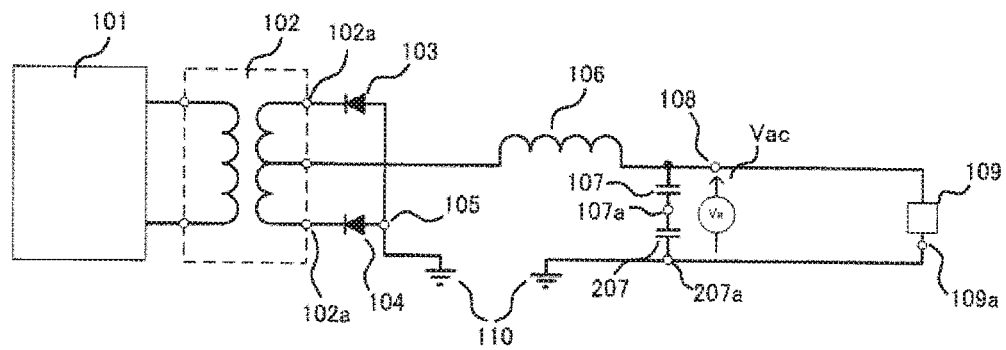
FIG. 28 is a schematic configuration diagram showing the power conversion device according to the fourth embodiment of the invention.

Next, there is also an aspect wherein two or more of the capacitor 107 are connected in series with respect to one isolation transformer 102, which is shown in FIG. 28 as an example in which two are connected in series. The second capacitor 207 connected in series to the capacitor 107 is connected to the negative terminal 107a of the capacitor 107, and the negative terminal 207a of the second capacitor 207 connected in series is connected to the negative terminal 109a of the load 109, then connected to the grounding surface 110. Because of this, voltage applied to one of the capacitors can be lowered, and although a parasitic inductance component of a capacitor through which only an AC current flows doubles in return for a short-circuit failure between the output terminal and the grounding surface 110 being preventable even when one of the two capacitors fails when a failure mode of the capacitors used is a short-circuit mode, an increase in output ripple and voltage spike can be kept to a minimum by adopting this configuration.

Figure 29:
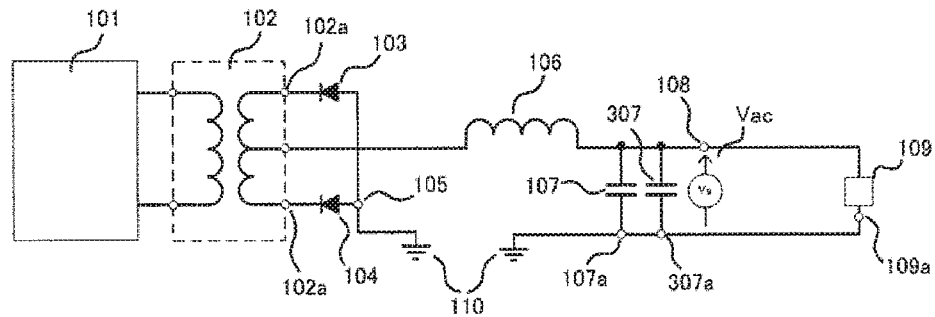
FIG. 29 is a schematic configuration diagram showing the power conversion device according to the fourth embodiment of the invention.

Also, there is also an aspect wherein two or more of the capacitor 107 are connected in parallel with respect to one isolation transformer 102, which is shown in FIG. 29 as an example in which two are connected in parallel. The third capacitor 307 is connected in parallel to the capacitor 107, and the negative terminal 307a of the third capacitor 307 connected in parallel is connected to the negative terminal 109a of the load 109 and the negative terminal 107a of the capacitor 107, then connected to the grounding surface 110. Because of this, a parasitic inductance component of a capacitor through which only an AC current flows is halved, because of which a ripple current flowing to each capacitor can be reduced, while further increasing the effect of reducing output ripple and voltage spike.

Furthermore, there is also an aspect wherein capacities of the two or more capacitors 107 are of differing capacity values, and can be adjusted to capacities responding to a multiple of frequency components included in output ripple and voltage spike, because of which noise can be reduced.

The invention is such that the AC current (Iac) flowing into the capacitor 107 always flows via the negative terminal 107a of the capacitor 107 into a path along which the DC current (Idc) flows, because of which a current path along which only Iac flows is shortest, and an inductance component in the path of Iac decreases, because of which ripple and the voltage spike (Vac) at the output terminal can be reduced.

In each of the embodiments, rectifying diodes are used as the first switch element 103 and the second switch element 104 connected to the isolation transformer 102, but when embodying the invention, another semiconductor switch element may be connected, and caused to operate in the same way using on/off control. Also, the reactor 106 need not necessarily be used.

Figure 30:
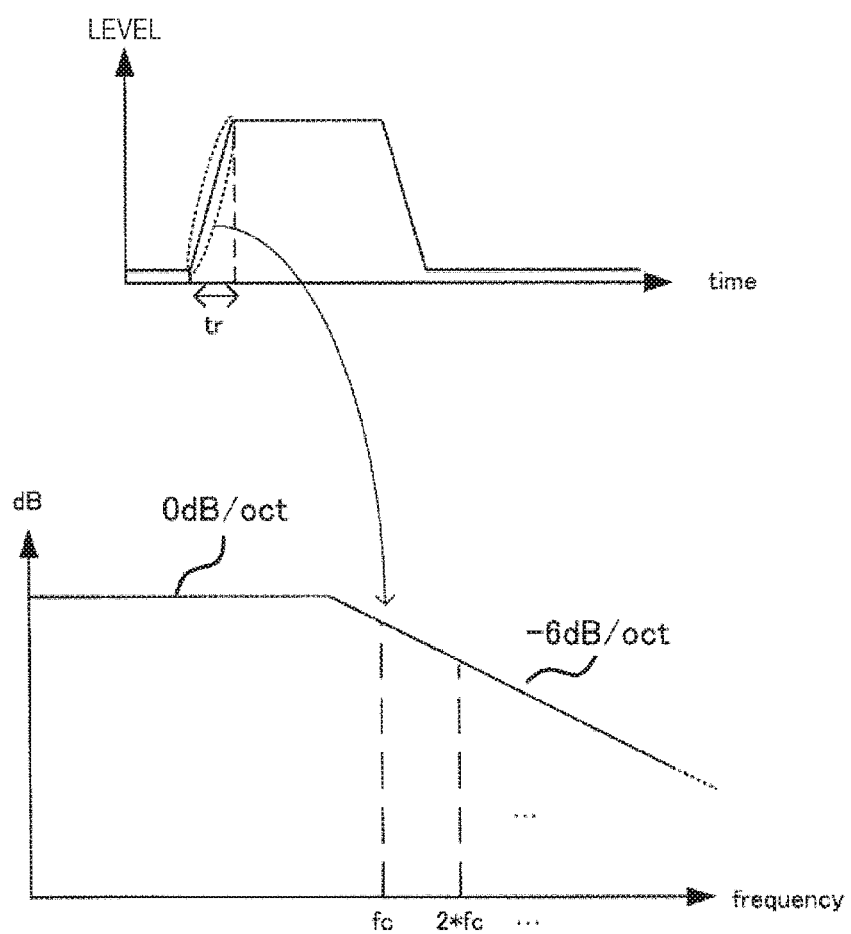
FIG. 30 is a high frequency characteristic diagram of when the invention is applied to a power conversion device in which a wide-bandgap semiconductor is adopted as a switch element.

Also, although a higher frequency drive can be carried out in each of the embodiments by using wide-bandgap semiconductors as a switch element used in the primary side circuit 101, and the first switch element 103 and the second switch element 104 connected to the secondary side winding of the isolation transformer 102, a high frequency component fc included in a pulse rise time tr also increases in accompaniment to the increase in frequency, as shown in FIG. 30, because of which an output ripple and a voltage spike of the high frequency component increase. In particular, as the high frequency component is considerably affected by a parasitic inductance of L*di/dt, a particular advantage is obtained in reducing the output ripple and the voltage spike of the high frequency component by applying the invention to a power conversion device in which wide-bandgap semiconductors are used as the switch elements, because of which the invention is convenient when wide-bandgap semiconductors are applied to the switch elements.

The embodiments can be freely combined, and arbitrary components of the embodiments can be changed or abbreviated as appropriate, without departing from the scope of the invention.

The invention claimed is:

1. A power conversion device, comprising:
a transformer circuit formed of a center-tapped isolation transformer that includes a center tap corresponding to a negative terminal of the center-tapped isolation transformer;
a rectifying circuit formed of a first semiconductor switch element and a second semiconductor switch element connected to the transformer circuit;
a smoothing circuit formed of a capacitor connected to the rectifying circuit;
a reactor provided between a connection point of the first semiconductor switch element and the second semiconductor switch element, and a positive terminal of the capacitor; and
a grounding surface to which a negative terminal of the load is connected, wherein
the center tap of the isolation transformer and a negative terminal of the capacitor are connected, before being connected to the grounding surface, and
a bus bar, a harness, or a substrate pattern that connects the center tap of the isolation transformer to the negative terminal of the capacitor, crosses a positive side current path that connects a positive terminal of the center-tapped isolation transformer to a positive side of the smoothing circuit, so as to cancel a magnetic field generated by current flowing from the positive terminal of the center-tapped isolation transformer to the positive side of the smoothing circuit and a magnetic field generated by current flowing from the center tap of the isolation transformer to the negative terminal of the capacitor.

2. The power conversion device according to claim 1, wherein the capacitor and the isolation transformer are integrally formed.

3. The power conversion device according to claim 1, wherein the transformer circuit comprises two or more isolation transformers including the center-tapped isolation transformer.

4. The power conversion device according to claim 3, wherein the two or more isolation transformers are connected in series.

5. The power conversion device according to claim 3, wherein the two or more isolation transformers are connected in parallel.

6. The power conversion device according to claim 1, wherein:
the transformer circuit comprises two or more isolation transformers including the center-tapped isolation transformer,
the smoothing circuit comprises two or more capacitors including the capacitor, and
the two or more capacitors are connected with respect to one of the two or more isolation transformers.

7. The power conversion device according to claim 6, wherein the two or more capacitors are connected in series.

8. The power conversion device according to claim 7, wherein two or more capacitors are configured of differing capacitance values.

9. The power conversion device according to claim 6, wherein two or more capacitors are connected in parallel.

10. The power conversion device according to claim 1, wherein the negative terminal of the isolation transformer and the negative terminal of the capacitor are connected via the bus bar.

11. The power conversion device according to claim 1, wherein the negative terminal of the isolation transformer and the negative terminal of the capacitor are connected via the harness.

12. The power conversion device according to claim 1, wherein the negative terminal of the isolation transformer and the negative terminal of the capacitor are connected via the substrate pattern.

13. The power conversion device according to claim 1, wherein each of the first semiconductor switch element and the second semiconductor switch element is a wide-bandgap semiconductor.

14. A power conversion device, comprising:
a transformer circuit formed of a center-tapped isolation transformer that includes a center tap corresponding to a negative terminal of the center-tapped isolation transformer;

a rectifying circuit formed of a first semiconductor switch element and a second semiconductor switch element connected to the transformer circuit;
a smoothing circuit formed of a capacitor connected to the rectifying circuit;
a reactor provided between a connection point of the first semiconductor switch element and the second semiconductor switch element, and a positive terminal of the capacitor;
and
a grounding surface to which a negative terminal of the load is connected, wherein
the center tap of the isolation transformer and a negative terminal of the capacitor are connected, before being connected to the grounding surface,
so as to cancel a magnetic field generated by current flowing to a positive side of the smoothing circuit and a magnetic field generated by current flowing to connecting parts that connect the center tap of the center-tapped isolation transformer and the negative terminal of the capacitor, and
the negative terminal of the isolation transformer and the negative terminal of the capacitor are directly connected.

* * * * *